(12) United States Patent
Ishizaka et al.

(10) Patent No.: US 9,520,997 B2
(45) Date of Patent: Dec. 13, 2016

(54) DEVICE, METHOD, AND MEDIUM FOR FACILITY MANAGEMENT VERIFICATION

(71) Applicants: Taichi Ishizaka, Tokyo (JP); Shigeki Suzuki, Tokyo (JP); Takahiro Ito, Tokyo (JP); Noriyuki Komiya, Tokyo (JP); Takeru Kuroiwa, Tokyo (JP)

(72) Inventors: Taichi Ishizaka, Tokyo (JP); Shigeki Suzuki, Tokyo (JP); Takahiro Ito, Tokyo (JP); Noriyuki Komiya, Tokyo (JP); Takeru Kuroiwa, Tokyo (JP)

(73) Assignee: Mitsubishi Electric Corporation, Tokyo (JP)

(\*) Notice: Subject to any disclaimer, the term of this patent is extended or adjusted under 35 U.S.C. 154(b) by 0 days.

(21) Appl. No.: 14/436,915

(22) PCT Filed: Oct. 29, 2012

(86) PCT No.: PCT/JP2012/077840
§ 371 (c)(1),
(2) Date: Apr. 20, 2015

(87) PCT Pub. No.: WO2014/068632
PCT Pub. Date: May 8, 2014

(65) Prior Publication Data
US 2015/0270969 A1 Sep. 24, 2015

(51) Int. Cl.
*H04L 9/32* (2006.01)
*G06F 7/04* (2006.01)
(Continued)

(52) U.S. Cl.
CPC ............... *H04L 9/321* (2013.01); *G06F 21/31* (2013.01); *G06F 21/41* (2013.01); *H04L 9/30* (2013.01);
(Continued)

(58) Field of Classification Search
CPC ........ H04L 63/08; H04L 63/0428; H04L 9/08; H04L 9/3281; H04L 63/10; H04L 9/30; G06F 21/31
(Continued)

(56) References Cited

U.S. PATENT DOCUMENTS

| 2002/0059310 A1* | 5/2002 | Choi | .................. G06F 11/0748 |
| 2006/0050671 A1* | 3/2006 | Kim | ........................ H04L 63/08 |
| | | | 370/338 |

(Continued)

FOREIGN PATENT DOCUMENTS

| GB | 2 287 160 A | 9/1995 |
| JP | H10-098778 A | 4/1998 |

(Continued)

OTHER PUBLICATIONS

International Search Report of the International Searching Authority mailed Jan. 22, 2013 for the corresponding international application No. PCT/JP2012/077840 (and English translation).

(Continued)

*Primary Examiner* — Aravind Moorthy
(74) *Attorney, Agent, or Firm* — Posz Law Group, PLC

(57) ABSTRACT

An equipment manager manages the operating state of equipment. A user verification processor performs user verification according to a request from a monitoring terminal, and when user verification is successful, generates for each facility management device a verification code in which verification data, to which a digital signature has been added using a self-owned secret key, has been encoded using a public key of each facility management device, and transmits the verification codes to the monitoring terminal. After receiving the verification code, a verification code analyzer decodes the verification code using the self-owned secret key, and performs verification by verifying the digital signature using the public key of a representative facility management device. When verification is successful, a Web server is able to monitor and manipulate data that indicates the operating states of all of the equipment that is managed by the equipment manager.

5 Claims, 12 Drawing Sheets

(51) Int. Cl.
*H04L 9/08* (2006.01)
*G06F 21/31* (2013.01)
*G06F 21/41* (2013.01)
*H04Q 9/00* (2006.01)
*H04L 9/30* (2006.01)
*H04L 12/24* (2006.01)
*H04L 29/06* (2006.01)
*H04L 29/08* (2006.01)

(52) U.S. Cl.
CPC ......... *H04L 9/3247* (2013.01); *H04L 41/0253* (2013.01); *H04L 41/28* (2013.01); *H04L 63/08* (2013.01); *H04L 63/0815* (2013.01); *H04L 63/126* (2013.01); *H04Q 9/00* (2013.01); *H04L 9/08* (2013.01); *H04L 9/3281* (2013.01); *H04L 41/22* (2013.01); *H04L 63/0428* (2013.01); *H04L 63/0442* (2013.01); *H04L 63/0807* (2013.01); *H04L 63/0823* (2013.01); *H04L 63/10* (2013.01); *H04L 67/02* (2013.01); *H04L 67/12* (2013.01); *H04L 67/125* (2013.01); *H04L 2209/24* (2013.01); *H04L 2209/72* (2013.01)

(58) Field of Classification Search
USPC .............. 713/185, 168, 176; 726/5; 380/282
See application file for complete search history.

(56) References Cited

U.S. PATENT DOCUMENTS

| | | | | |
|---|---|---|---|---|
| 2008/0137823 | A1* | 6/2008 | Abichandani | H04L 12/66 379/106.01 |
| 2010/0122091 | A1 | 5/2010 | Huang et al. | |
| 2012/0005474 | A1* | 1/2012 | Bourret | G06F 21/34 713/150 |
| 2012/0173682 | A1* | 7/2012 | Mantere | G06F 9/44505 709/221 |
| 2012/0240207 | A1* | 9/2012 | Kato | G06F 21/31 726/7 |
| 2013/0139231 | A1* | 5/2013 | Singh | G06F 21/43 726/6 |
| 2013/0191887 | A1* | 7/2013 | Davis | H04L 63/0823 726/5 |
| 2015/0229793 | A1* | 8/2015 | Melo | G06Q 10/06 358/1.15 |

FOREIGN PATENT DOCUMENTS

| | | |
|---|---|---|
| JP | H10-302000 A | 11/1998 |
| JP | 2001-111704 A | 4/2001 |
| JP | 2002-269272 A | 9/2002 |
| JP | 2003-323409 A | 11/2003 |
| JP | 2005-348164 A | 12/2005 |

OTHER PUBLICATIONS

Takahiro Katayama. "Notes/ Domino & WebSphere Notes/ Domino no Solution o Kakudai suru Atarashii Hybrid Platform no Kochikuho". Notes/ Domino Magazine, vol. 6, No. 6, Jun. 1, 2001, pp. 102-106.

Extended European Search Report dated Apr. 15, 2016 issued in corresponding EP patent application No. 12887613.3.

Office Action mailed Jun. 21, 2016 issued in corresponding JP patent application No. 2014-544064 (and English translation).

* cited by examiner

DEVICE, METHOD, AND MEDIUM FOR FACILITY MANAGEMENT VERIFICATION

CROSS REFERENCE TO RELATED APPLICATION

This application is a U.S. national stage application of PCT/JP2012/077840 filed on Oct. 29, 2012, the disclosure of which is incorporated herein by reference.

TECHNICAL FIELD

The present disclosure relates to a facility management device, a facility management system and a program.

BACKGROUND ART

Installing facility management devices that manage equipment such as air-conditioning equipment, lighting and the like in housing in buildings and the like has become commonplace. Of these kinds of facility management devices, there are devices that, by a building manager accessing the device from a Web browser of a personal computer (user terminal), make it possible to monitor the operating state of equipment by way of a LAN (Local Area Network) inside the building, or by way of the Internet.

In this kind of facility management device, user verification is performed in order to prevent unauthorized access. When the facility management device is accessed, a login screen is displayed on the Web browser of the user terminal. The login screen is an input screen for inputting a user ID and password. After the user ID and password are inputted, user verification is performed by the facility management device using that user ID and password. When the user verification is completed properly, the contents of a Web page that was sent from the facility management device for monitoring equipment is displayed on the Web browser, and it becomes possible to monitor the state of the equipment.

Here, the case will be considered in which a facility management device is installed at the entrance to each floor of a building, or for each building (in other words, multiple facility management devices are installed). In this case, in order to simultaneously monitor the state of a plurality of equipment manage by multiple facility management devices, it is necessary to individually display multiple login screens that correspond to each of the facility management devices on the Web browser, and input the user ID and password on each login screen. That is, in order to simultaneously monitor the state of a plurality of equipment that is managed by multiple facility management devices, it is necessary to perform login for each of the target facility management devices. Therefore, as the number of facility management devices increases, the number of times that login is performed increases, so management becomes time-consuming.

Typically, as technology for making it possible to access multiple Web servers by performing verification only one time, there is single sign-on technology that uses the SAML (Security Assertion Markup Language) method. In the SAML method, first, a verification server is accessed from a Web browser of a user terminal, and the verification server performs user verification. After doing so, verification information is issued to the user terminal from the verification server. The issued verification information is added and a target Web site is connected to from the user terminal, after which the Web site makes an inquiry of the verification server for the verification information. When the verification information has been properly issued, the contents of the Web site are transmitted to the user terminal.

Moreover, a verification proxy device has been disclosed that makes possible a single sign-on function that does not use the SAML method (for example, refer to Patent Literature 1). This verification proxy device issues a Cookie, in which registration information for each individual business is embedded, to a user device. The user device transmits the acquired Cookie to a resource management device of each of the businesses, after which, each resource management device allows access from the user device only when the registration information inside the Cookie matches registration information that is stored by the business.

CITATION LIST

Patent Literature

[Patent Literature 1] Unexamined Japanese Patent Application Kokai Publication No. 2002-269272

SUMMARY OF INVENTION

Technical Problem

In a system that monitors the state of equipment from a remote location via the Internet, it is necessary to make sure that unauthorized access to the equipment is not possible from an unspecified large number of terminals. In order to do this, VPN (Virtual Private Network) technology is often used in such systems. In VPN technology, a VPN router that is capable of VPN connection is located at each base. A monitoring terminal (personal computer) that is connected to the Internet connects to the VPN router at each base, and is able to perform communication with the facility management device located at each base only by way of the VPN router.

In this kind of system, in order to reduce the cost necessary for the VPN equipment, a mesh-type VPN connection that makes it possible for free communication among multiple bases is often not employed. In this case, there is a one-to-one connection between the monitoring terminal (personal computer) and the VPN router that is located at the base. In this kind of connection method, it is not possible for a facility management device at one certain base to communication with a facility management device at another base. Therefore, when one facility management device is given a verification server function and is taken to be a parent device, and the other facility management devices are taken to be child devices, it is not possible to perform communication between a facility management device (parent device) and a facility management device (child device) using the SAML method. As a result, it is difficult to share verification information among facility management devices. From this aspect, in the SAML method, achieving single sign-on that allows access to multiple facility management devices that are located at each of bases that can be accessed by way of VPN routers by performing login one time was very difficult.

Moreover, the verification proxy device of Patent Literature 1 issues a Cookie, in which identification information for each business is embedded, to a user device. A resource management device performs verification by comparing the identification information that was embedded in the Cookie transmitted from the user device with identification information in the resource management device. In doing so, it is possible to perform verification only one time when accessing multiple resource management devices, without having to perform direct communication between the verification proxy device and resource management device. However, in this technique, there is no method for checking whether or not the Cookie that was transmitted from the user device to the resource management device was really issued from the verification proxy device. For example, as long as a user knows the ID (for example, mail address) that is registered for a business, it is possible to create an unauthorized Cookie for verification without knowing the user ID or password, so unauthorized access using a false identity becomes possible without performing verification with the verification proxy device. Therefore, safe operation of the verification system was difficult even when using the verification proxy device of Patent Literature 1 above.

In order to solve the problem described above, the object of the present disclosure is to provide a facility management device, facility management system and program capable of safely monitoring multiple facility management devices at low cost.

Solution to Problem

In order to accomplish the object above, the facility management device of this disclosure is a facility management device that manages equipment, including:

an equipment manager that manages the operating state of the equipment;

a user verification processor that, when an own device is a representative facility management device of multiple facility management devices, performs user verification according to a request from a monitoring terminal, and when user verification is successful, generates verification codes for each of the facility management devices by encoding verification data, to which a digital signature has been added using a secret key of the own device, using public keys of each of the facility management devices, and transmits those verification codes to the monitoring terminal;

a verification code analyzer that receives a verification code that was generated for the own device facility management device from the monitoring terminal, and then decodes the received verification code using the secret key of the own device, and performs verification by verifying the digital signature using the public key of the representative facility management device; and a Web server that, when verification by the user verification processor or the verification code analyzer is successful, is able to monitor and manipulate data that indicates the operating state of all of the equipment that is managed by the facility management devices.

Advantageous Effects of Invention

According to the present disclosure, when user verification of the monitoring terminal is successful, verification codes are generated for each facility management device by encoding verification data, to which a digital signature was added using a secret key of a representative facility management device, using public keys of each facility management device, and those verification codes are transmitted to the monitoring terminal. A verification code performs a digital signature using the secret key of the representative facility management device, so it is not possible for a user with malicious intent to generate a forged digital signature for the verification data. Moreover, the verification code is encoded using a public key of a specified facility management device, so it is only possible to decode the verification code using the secret key of that facility management device. In other words, the verification code can only be generated by the representative facility management device that performed user verification, and is code that can only be decoded by a specified facility management device. Therefore, by using this verification code, it becomes possible for each facility management device to safely verify that the user was verified by the representative facility management device, and together with being able to access multiple facility management devices by performing user verification only one time, it is also possible to prevent unauthorized access by forging the verification code or by identity fraud. As a result, it is possible to safely monitor multiple facility management devices at low cost.

DESCRIPTION OF EMBODIMENTS

In the following, an embodiment of the present disclosure will be explained in detail with reference to the drawings.

Figure 1:
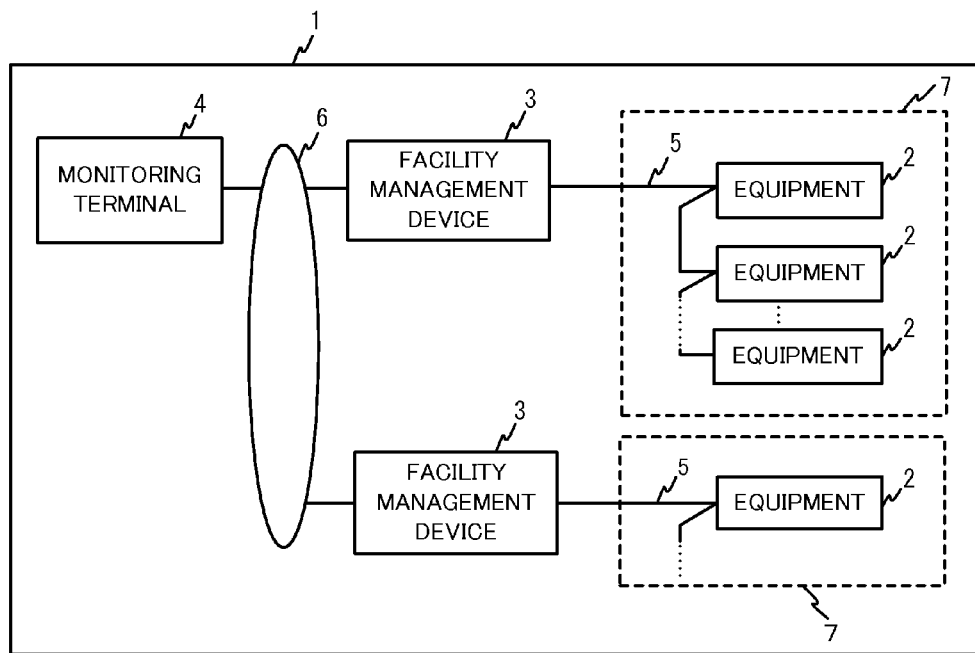
FIG. 1 is a block diagram illustrating the construction of a facility management system of an embodiment of the present disclosure.

FIG. 1 illustrates the construction of a facility management system 1 of an embodiment of the present disclosure. As illustrated in FIG. 1, the facility management system 1 of this embodiment comprises equipment 2, facility management devices 3 and a monitoring terminal 4. There is a plurality of equipment 2 and multiple facility management devices 3.

The equipment 2 and facility management devices 3 are connected by way of dedicated communication lines 5 so that communication is possible. Moreover, the facility management devices 3 and monitoring terminal 4 are connected by way of communication lines 6 so that communication is possible. The communication lines 6 can be a LAN that is connected inside the same base. The communication lines 6 can also be an Internet lines or the like that connect the monitoring terminal 4 and facility management devices 3 by way of a VPN router.

Various kinds of equipment that are installed in a building can be imagined as the equipment 2. This kind of equipment 2 includes, for example, air-conditioning equipment, lighting equipment, water-heating equipment and the like.

The plurality of equipment 2 is respectively installed at specified locations inside a building. All of the equipment 2 is operated under the management of the facility management devices 3. A notification of the operating state of the equipment 2 is sent to the facility management devices 3 by way of the dedicated communication lines 5. Hereafter, a plurality of equipment 2 that is connected to the same facility management device 3 will be called an equipment group 7.

Figure 2:
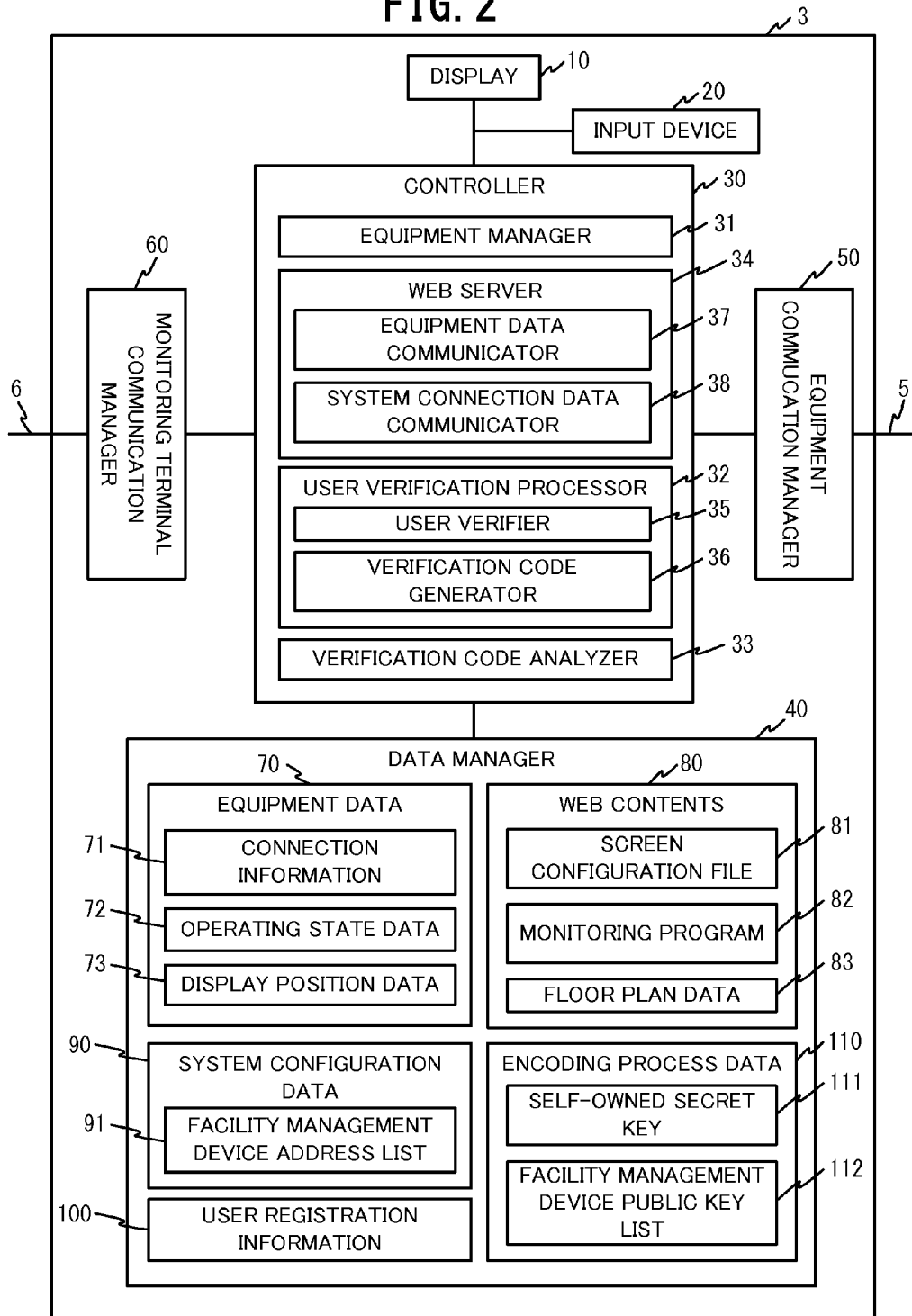
FIG. 2 is a block diagram illustrating the construction of a facility management device of an embodiment of the present disclosure.

A facility management device 3 performs overall management of an equipment group 7 that includes a plurality of equipment 2. As illustrated in FIG. 2, a facility management device 3 comprises a display 10, an input device 20, controller 30, data manager 40, equipment communication manager 50 and monitoring terminal communication manager 60.

The display 10 displays various screens for performing management (monitoring, control) of an equipment group 7 under the control of the controller 30.

The input device 20 is an input device such as a mouse, a keyboard, a touch panel and the like according to the operation. When the input device 20 is a touch panel, the input device 20 is located on the display 10. By operating the input device 20, a manager is able to perform operations such as switching the screen, or operating the equipment.

The controller 30 is a computer that comprises a CPU (Central Processing Unit), memory and the like. The function of the controller 30 is achieved by the CPU executing a program that is stored in memory.

The controller 30 maintains (manages) the operating state of the equipment 2, and performs processing for transmitting and receiving data required for the monitoring screen that is displayed on the monitoring terminal 4.

The controller 30 includes an equipment manager 31, a user verification processor 32, a verification code analyzer 33 and a Web server 34.

The equipment manager 31 manages (monitors, controls) the operating state of the equipment 2.

The user verification processor 32 performs user verification and generates verification code. More specifically, the user verification processor 32 performs user verification according to a request from the monitoring terminal 4 when the own device is a representative facility management device 3 of the multiple facility management devices 3. When user verification is successful, the user verification processor 32 adds a digital signature to the verification data using a secret key of the user verification processor 32, and also generates Cookies having verification codes that were encoded using the public keys of the respective facility management devices 3 as the data contents, and issues the Cookies to the monitoring terminal 4 for all of the facility management devices 3.

The user verification processor 32 includes a user verifier 35 and verification code generator 36. The user verifier 35 performs verification of the user by using the user ID, password and the like. The verification code generator 36 generates verification code that will be issued to the monitoring terminal 4 when verification is successful.

The verification code analyzer 33 analyzes the verification code that is included in the Cookie that is added during access from the monitoring terminal 4. When the Cookie that is sent from the monitoring terminal 4 is received, the verification code analyzer 33 performs verification by decoding the verification code inside the Cookie using a self-owned secret key, and also by verifying the digital signature using the public key of the representative facility management device (parent device) 3.

The Web server 34 transmits and receives Web contents 80 or monitoring instructions and operating instructions and the like. When verification by the user verification processor 32 or verification code analyzer 33 was successful, the Web server 34 executes processing according to monitoring instructions or setting instructions from the monitoring terminal 4 in order to monitor data that indicates the operating state of the equipment 2 and to enable operation, and sends the processing results to the monitoring terminal 4.

The Web server 34 includes an equipment data communicator 37 and system connection data communicator 38. The equipment data communicator 37 performs operating state monitor responses and operation processing according to monitoring instructions and operation instructions from the monitoring terminal 4. The system connecting data communicator 38 performs setting and monitoring of a facility management device address list 91 that stores address information for the connected facility management devices 3.

The data manager 40 manages various kinds of data that are required for the controller 30 to perform monitoring of an equipment group 7, various kinds of data that are required for generating verification code for multiple facility management devices 3, and various kinds of data for displaying a monitoring screen on the monitoring terminal 4.

The data that is managed by the data manager 40 can be roughly classified into equipment data 70, Web contents 80, system configuration data 90, user registration information 100 and encoding process data 110.

The equipment data 70 includes connection information 71 for each of the equipment 2, operating state data 72, and display position data 73 for displaying icons for facility management devices 3, equipment 2 and the like on a floor plan.

The connection information 71 is data, such as address numbers, operation group numbers, model type identification information and the like for all of the equipment 2 that is managed by facility management devices 3, that is required for controlling an equipment group 7.

The operating state data 72 is data that indicates the current operating state of the equipment 2 (for example, in the case of air-conditioning equipment, indicates the operating or stopped state, the operating mode such as cooling or heating, the set temperature, the room temperature and the like). The operating state data 72 is constantly being updated to the most recent state by exchanging data with all of the equipment 2.

The display position data 73 is position information such as the latitude and longitude of the building that a facility management device 3 manages, and is data that indicates the floor number inside the building where the equipment 2 is located, and the X and Y coordinates of the equipment on a floor plan. The display position data 73 is used when arranging icons for the facility management devices 3 or icons for the equipment 2 on the monitoring screen of the monitoring terminal 4.

The X and Y coordinates that indicate the display position of equipment icons can be specified using absolute values.

Moreover, the display positions of icons can be indicated as a percentage (0 to 100%) with respect to the vertical and horizontal size of the floor plan. In that case, the display position of the equipment 2 icons can be continuously changed as the floor plan is enlarged or reduced.

The Web contents 80 include a screen configuration file 81, a monitoring program 82 and floor plan data 83. The screen configuration file 81 is a file in which the layout configuration of the screen that is displayed on the monitoring terminal 4 is entered. The monitoring program 82 is a program that is executed on the Web browser, and that performs various kinds of communication processing and screen display processing. Floor plan data 83 is data for a floor plan such as the floor that is the background of the monitoring screen.

The screen configuration file 81, monitoring program 82 and floor plan data 83 will be explained in further detail.

The screen configuration file 81 is a file that includes layout configuration files for screens that are displayed on the monitoring terminal 4, and various kinds of image files. The screen configuration file 81 includes HTML (HyperText Markup Language) files that describe the frame configuration. The screen configuration file 81 includes various kinds of files that are entered in GIF (Graphics Interchange Format), JPEG (Joint Photographic Experts Group) format, BMP (Bitmap) format and the like.

The monitoring program 82 is a program that is transmitted to the monitoring terminal 4 by the Web server 34, and is executed by the Web browser of the monitoring terminal 4. The monitoring program 82 is a program that performs communication with the facility management device 3 and displays a monitoring screen. The monitoring program 82 is a program that is entered using a language such as JavaScript (registered trademark).

The monitoring program 82 is a program that acquires various operating state data from the equipment manager 31 for the multiple facility management devices 3, and displays together the operating states of the equipment 2 managed by the multiple facility management devices 3 on the Web browser of the monitoring terminal 4.

The floor plan data 83 is for an image that is displayed as the background of the monitoring screen in order to make clear the installation location of a building and equipment 2 inside the building. The floor plan data 83 stores maps, aerial photographs, floor plan images in floor units inside the building, and the like.

In this embodiment, the data manager 40 corresponds to a floor plan storage that stores floor plan images of floors where the plurality of equipment 2 is located. Moreover, the data manager 40 corresponds to display a position data storage that stores display position data that indicates the display position on a floor plan of the plurality of equipment 2. The monitoring program 82 is a program that is executed by the Web browser, and that acquires floor plan images that are stored by the data manager 40, and display position data that is stored by the data manager 40 from each of the facility management devices 3. Furthermore, the monitoring program 82 is a program that displays the icons on the Web browser of the monitoring terminal 4 by superimposing icons that indicate the operating states of the plurality of equipment 2 at positions on the floor plan image indicated by the display position data 73.

The system configuration data 90 is stored inside the representative facility management device (parent device) 3. The system configuration data 90 includes a facility management device address list 91 in which contents are entered that can identify connection destinations on the network such as the IP addresses, domain names, host names and the like of the multiple facility management devices 3.

The user registration information 100 is used when performing user verification. The user registration information 100 is stored in the representative facility management device (parent device) 3 as a list of multiple user IDs and passwords that allow connection. The user registration information 100 is not limited to being user IDs and passwords, and can also be data for use in other means capable of uniquely identifying a user such as fingerprint verification data, digital identification, and the like.

Encoding process data 110 includes a self-owned secret key 111 that is used in the verification sequence, and a facility management device public key list 112 that corresponds to the facility management device address list 91.

The self-owned secret key 111 is one of a key pair (public key, secret key) that is generated using the scheme of the public key encoding method. Data that is encrypted using the own device public key can only be decoded by using the self-owned secret key 111.

Public keys for multiple facility management devices 3 are stored in the facility management device public key list 112. The representative facility management device (parent device) 3 stores its own device public key and public keys for multiple facility management devices 3 that correspond to facility management device address list 91. Moreover, the other facility management devices (child devices) 3 store the public key of the representative facility management device (patent device) 3. As above, the data manager 40 corresponds to the public key list storage that stores a list of each of the public keys of the multiple facility management devices 3 including the own device and those of other facility management devices 3.

A typical public key is data that is just an array of numbers. However, when ID based encoding technology is used, it is possible for the public key to be a specific character string such as a product serial number. In this embodiment, the unique serial numbers of the facility management devices 3, which includes the representative facility management device and other facility management devices 3.

The equipment communication manager 50 is an interface with the dedicated communication lines 5. Data is exchanged with the equipment 2 by way of this equipment communication manager 50. The dedicated lines 5 are not necessarily special communication lines, and it is possible to use general-purpose communication lines such as LAN, RS-485 interface, and the like.

The monitoring terminal communication manager 60 is an interface with the communication lines 6. Data is exchanged with the monitoring terminal 4 by way of this monitoring terminal communication manager 60. The communication lines 6 can be LAN or wireless LAN. Moreover, it is also possible to use Internet lines that are able to connect the monitoring terminal 4 and facility management devices 3 by way of a VPN router or the like.

Figure 3:
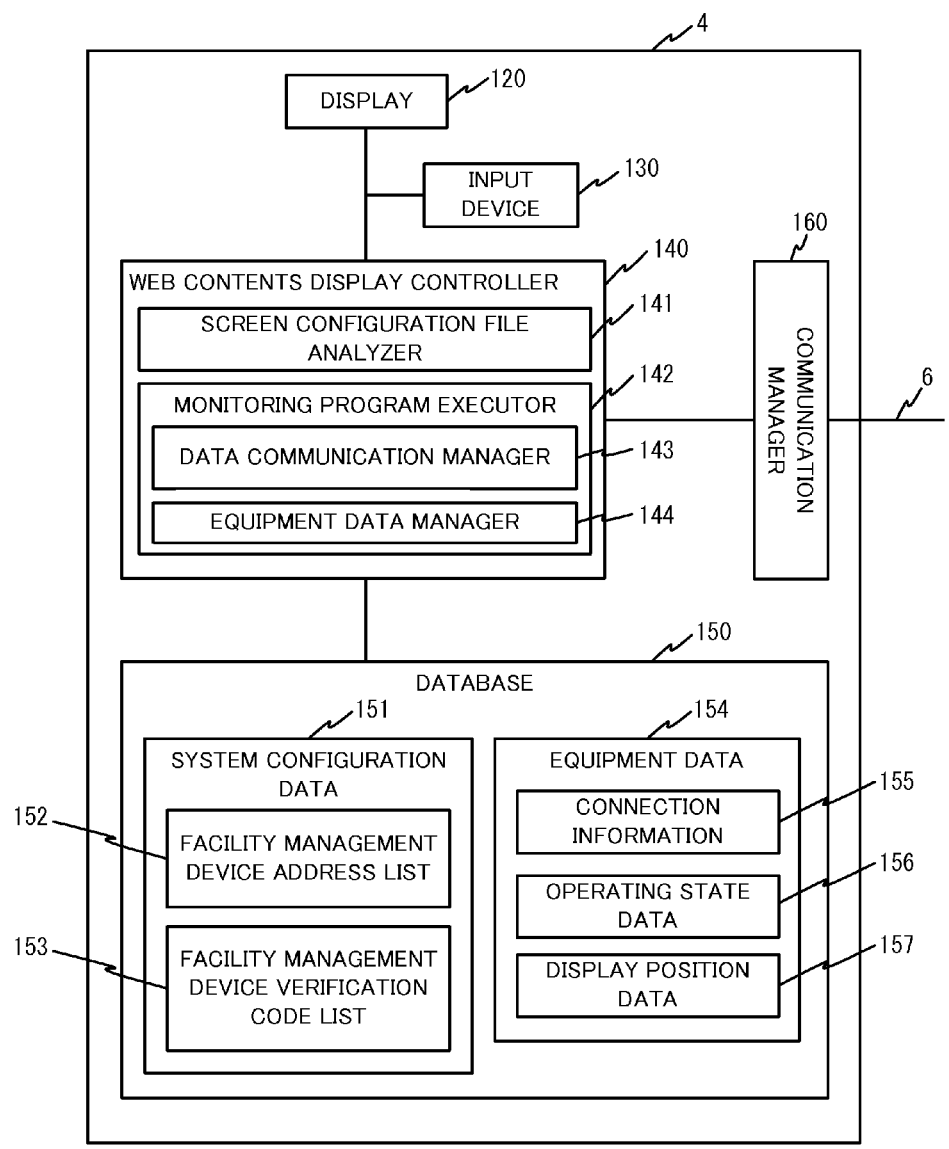
FIG. 3 is a block diagram illustrating the construction of a monitoring terminal of an embodiment of the present disclosure.

The monitoring terminal 4 is a general-purpose computer on which a Web browser is able to operate. The monitoring terminal 4 displays monitoring screens according to Web contents 80 received from a facility management device 3. More specifically, the monitoring terminal 4 accesses each of the facility management devices 3 using the Web browser, and acquires the operating states of all of the equipment 2 from the facility management devices 3 that manage the plurality of equipment 2 and displays the respective operating states. As illustrated in FIG. 3, the monitoring terminal 4 comprises a display 120, an input device 130, a Web contents display controller 140, a database 150 and a communication manager 160.

The display 120, under the control of the Web contents display controller 140, displays Web contents 80 that were acquired from the facility management devices 3.

The input device 130 is an input device such as a mouse, a keyboard, a touch panel or the like. When the input device 130 is a touch panel, the input device 130 is located on the display 120. By operating the input device 130 such as the mouse, the manager is able to switch screens, operate the equipment 2 or the like.

The Web contents display controller 140 performs processing in order to perform communication with the facility management device 3 at the connection destination input from input device 130, acquire Web contents 80, and display a monitoring screen for the equipment group 7 on the display 120. The Web contents display controller 140 includes a screen configuration file analyzer 141 and monitoring program executor 142.

The screen configuration file analyzer 141 analyzes acquired screen configuration files 81. The monitoring program executor 142 executes a monitoring program that was downloaded from a facility management device 3. The monitoring program executor 142 includes a data communication manager 143 and equipment data manager 144. The data communication manager 143 performs communication processing for communication with a facility management device 3. The equipment data manager 144 performs management of equipment data 70.

The database 150 manages various kinds of data used by the monitoring program executor 142. The database 150 includes system configuration data 151 and equipment data 154.

The system configuration data 151 includes a facility management device address list 152. The facility management device address list 152 includes IP addresses, domain names and host names that are the identification information for the facility management devices 3 at the communication destinations.

The equipment data 154 includes connection information 155 for the equipment, operating state data 156, and display position data 157. The equipment data 153 is kept updated by the equipment data manager 144.

The communication manager 160 is an interface with the communication lines 6. Data is exchanged with the facility management devices 3 by way of this communication manager 160.

Next, the operation of the facility management devices 3 and monitoring terminal 4 during user verification will be explained with reference to FIG. 4 and FIG. 5

Figure 4:
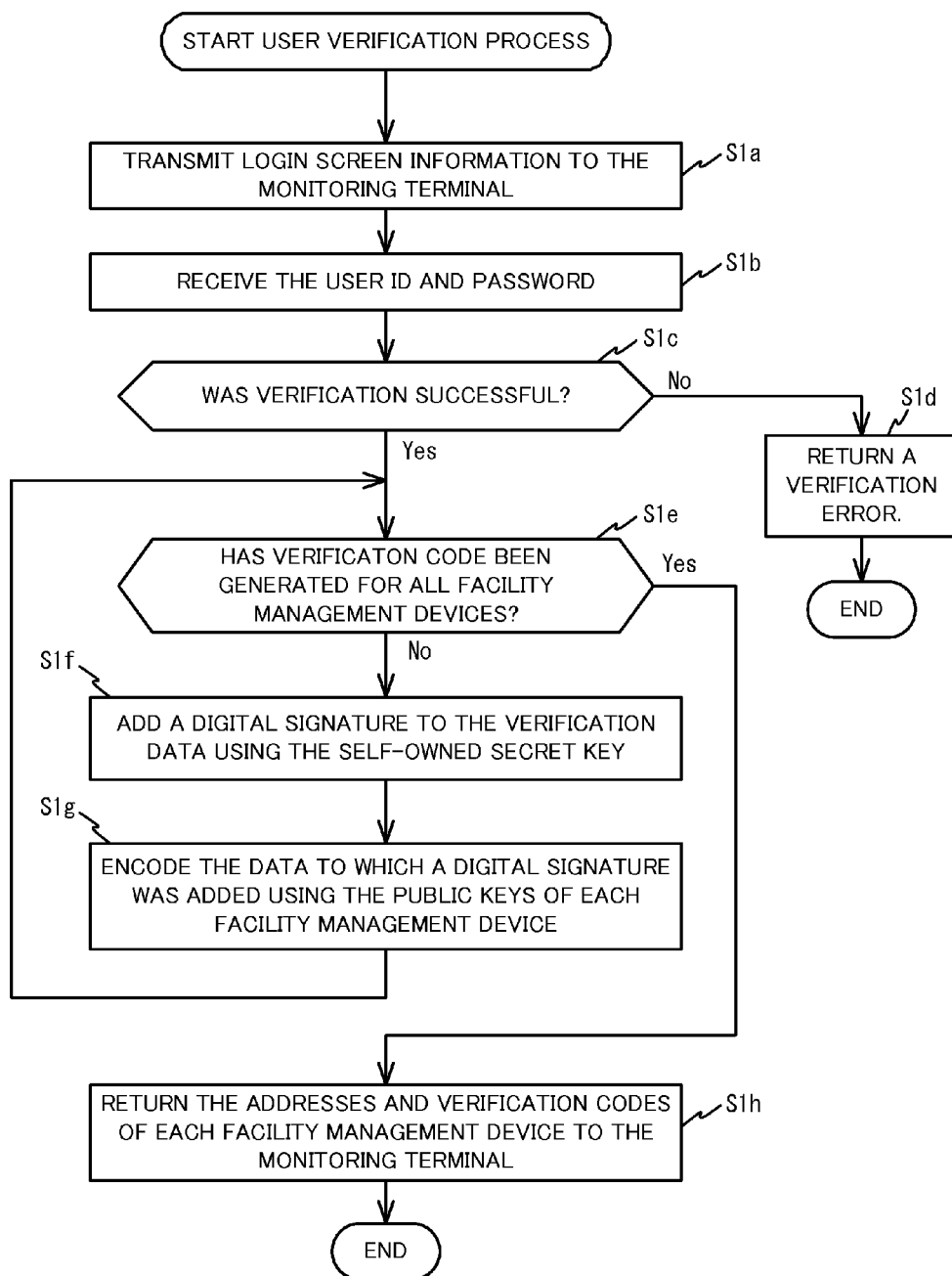
FIG. 4 is a flowchart of a user verification process that is executed by a facility management device.
Figure 5:
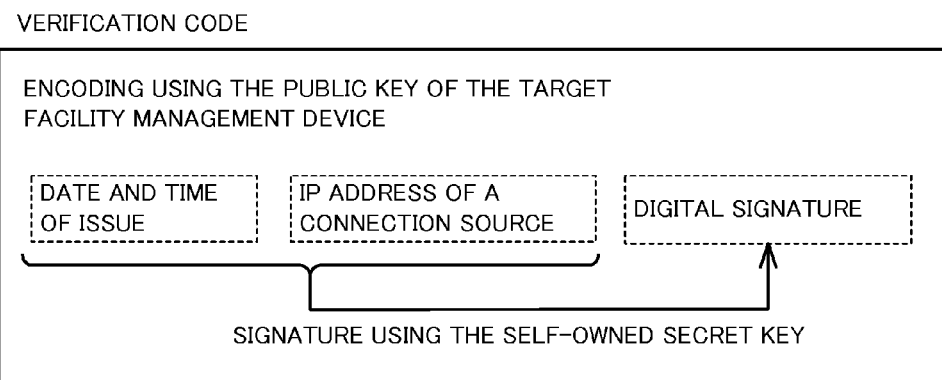
FIG. 5 is a schematic diagram illustrating the format of verification code.

FIG. 4 illustrates user verification processing that is executed by a facility management device 3.

After the URL for the representative facility management device (parent device) 3 is inputted using the Web browser of the monitoring terminal 4, the Web contents display controller 140 starts the connection to the facility management device 3 by way of the communication manager 160 according to the HTTP protocol (HyperText Transfer Protocol). The controller 30 (Web server 34) of the facility management device 3 transmits Web contents 80 (login screen information) for the login screen display to the monitoring terminal 4 by way of the monitoring terminal communication manager 60 (step S1a). As a result, the login screen is displayed on the display 120 of the monitoring terminal 4.

The user uses the input device 130 of the monitoring terminal 4 and inputs a user ID and password on the login screen, after which, the monitoring terminal 4 (Web contents display controller 140) transmits the user ID and password to the facility management device 3 by way of the communication manager 160. The controller 30 (Web server 34) of the facility management device 3 receives the user ID and password (step S1b).

The user verifier 35 of the facility management device 3 compares the received user ID and password with the data in the user registration information 100 and determines whether or not verification was successful (step S1c). Here, when verification has failed (step S1c: NO), the facility management device 3 (user verifier 35) returns a verification error to the monitoring terminal 4 (step S1d), and ends processing. On the other hand, when the data matches and verification is successful (step S1c: YES), the facility management device 3 (controller 30) regards verification as being complete, and executes the procedure below.

First, the facility management device 3 (controller 30) determines whether or not generation of verification codes for all of the facility management devices 3 has been completed (step S1e). Here, the device is still just the first device, so the judgment is NO (step S1e: NO), and the facility management device 3 (controller 30) proceeds to step S1f.

Next, in step S1f and S1g, the verification code generator 36 generates verification code using the self-owned secret key 111 and facility management device public key list 112 inside the encoding process data 110.

The verification code generator 36 first uses the self-owned secret key 111 to add a digital signature to the verification data as data indicating that the own device user verification was successful (step S1f). This verification data includes the date and time that the verification code was issued, and the IP address of the connection source. Furthermore, the verification code generator 36 encodes the data to which the digital signature was added using the public key (serial number) of the facility management device 3 (step S1g). In this case, the verification code has the format illustrated in FIG. 5, for example.

The verification code generator 36 repeats steps S1f and step S1g until generation of verification codes for all of the facility management devices 3 is complete.

After generation of the verification codes for all of the facility management devices (parent device and child devices) 3 that are registered in the facility management device public key list 112 has been completed (step S1e: YES), the facility management device 3 (controller 30) generates Cookies for the IP addresses inside the facility management device address list 91 in the system configuration data 90 that includes the generated verification codes for all of the facility management devices 3, and returns those Cookies to the monitoring terminal 4 (step S1h).

In this way, the user verification processor 32 prevents manipulation of verification data by adding a digital signature using the self-owned secret key 11, and furthermore, the user verification processor 32 generates verification codes that cannot be decoded by devices other than the specified facility management devices by encoding the verification data to which a digital signature was added by using the public keys (serial numbers) of the facility management devices 3.

The user verification process between the monitoring terminal 4 and the facility management device (parent device) 3 then ends. As a result, the monitoring terminal 4 acquires verification codes that allow access to each of the facility management devices 3 as Cookies for the facility management devices 3.

The monitoring terminal 4 stores the acquired addresses as a facility management device address list 152 in the system configuration data 151. Moreover, the Cookies that include verification codes issued by the facility management devices 3 are stored by the Web browser that is executed by the monitoring terminal 4. Hereafter, when accessing the facility management devices 3, the Web browser of the monitoring terminal 4 determines the added Cookie according to the IP address (domain name) of the facility management device 3 that is the connection destination, then adds the Cookie of the connection target to an HTTP header and transmits a monitoring or setting command to the facility management device 3.

The verification code that is included in the Cookie performs a digital signature using the secret key of the facility management device (parent device) 3, so even though a user with malicious intent may attempt to manipulate the verification code or forge the verification code, the user does not know the secret key of the facility management device (parent device) 3, so it is not able to add the correct signature. Therefore, data inside the issued verification code cannot be manipulated, and the data can be guaranteed as having been properly issued by the facility management device (parent device) 3.

Furthermore, encoding is performed using the public keys (serial numbers) of the facility management devices (parent device and child devices) 3, so the verification code can only be decoded using the secret key of the target facility management device, and even though a verification code is acquired by being intercepted or the like, the contents cannot be read. Moreover, a verification code cannot be forged by analyzing the contents. As a result, it is possible to prevent improper access.

The format of the verification code above is just one example. As long as a method is used for performing a digital signature of data using the self-owned secret key 111, and further performing encoding using the public key of the target facility management device 3, it is also possible to further change, add or delete data elements of the verification code by using the verification code.

Next, the verification code verifying process that is executed by each facility management device 3 when the monitoring terminal 4 accesses each facility management device 3 from the monitoring terminal 4 after user verification has been completed will be explained with reference to FIG. 6.

Figure 6:
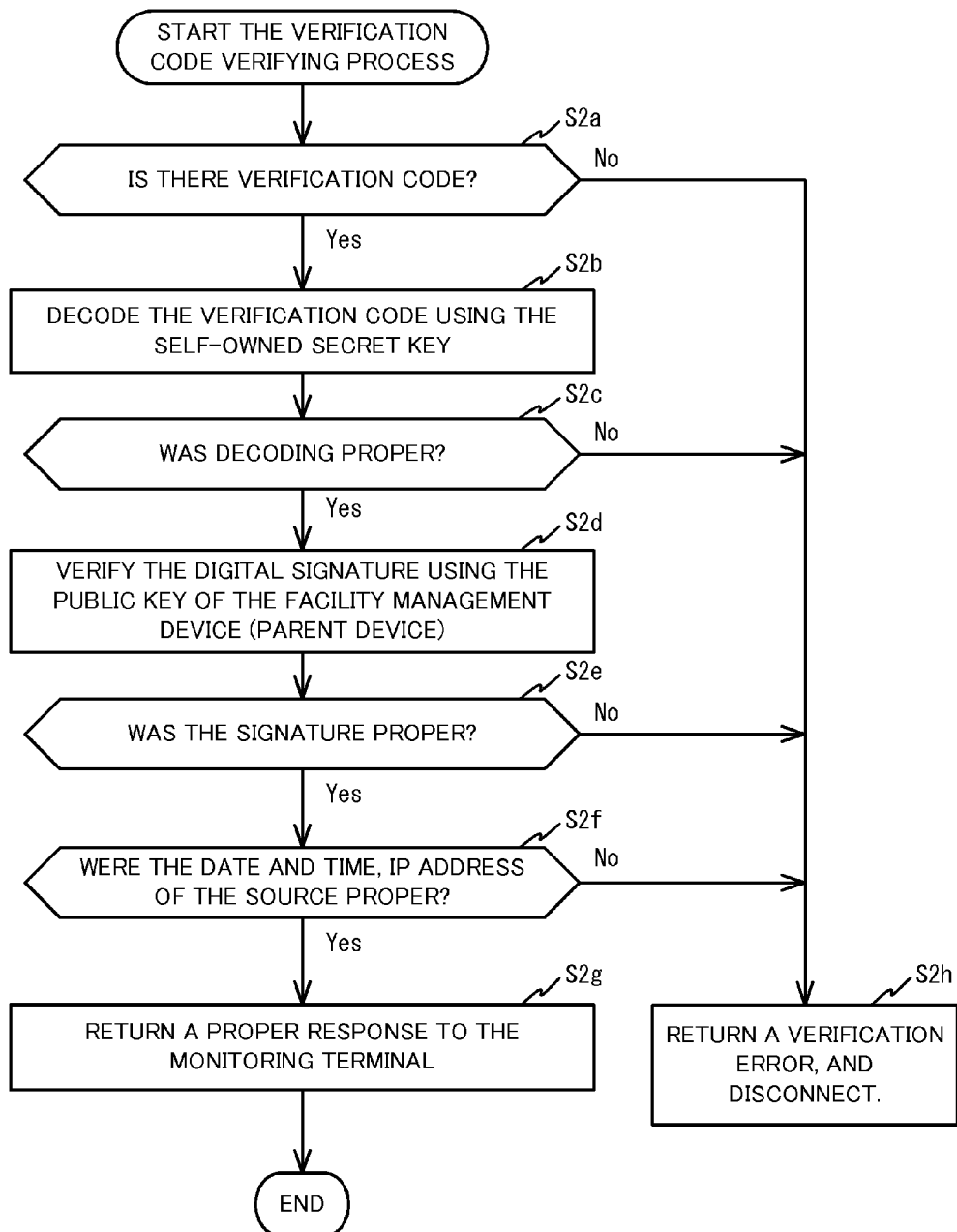
FIG. 6 is a flowchart of a verification code detection process that is executed by a facility management device.

FIG. 6 illustrates the verification code verifying process that is executed by each facility management device 3 when the Web browser of the monitoring terminal 4 connects to each facility management device 3 after verification has been completed.

When transmitting a monitoring or setting command to a facility management device 3 from the monitoring terminal 4 after user verification was successful, the monitoring terminal 4 adds a Cookie that includes the verification code to the HTTP header of a request command, and transmits that command to the facility management device 3.

The facility management device 3 determines whether or not a verification code was added to the received command (step S2*a*). When verification code was not added (step S2*a*: NO), the facility management device 3 returns a verification error to the monitoring terminal 4, and disconnects the connection (step S2*h*). On the other hand, when it is determined that verification code is added to the command (step S2*a*: YES), verifying of the verification code begins.

First, the verification code analyzer 33 of the facility management device 3 decodes the verification code using the self-owned secret key 111 (step S2*b*). Next, the verification code analyzer 33 determines whether or not the verification code was decoded correctly (step S2*c*). When the code was not decoded correctly and an error occurs (step S2*c*: NO), the facility management device 3 returns a verification error to the monitoring terminal 4 and disconnects the connection (step S2*h*). When the code was decoded correctly (step S2*c*: YES), processing continues with the verifying process of digital signature below.

First, the verification code analyzer 33 verifies whether or not the digital signature inside the verification code that was decoded in step S2*b* is correct by using the public key (serial number) of the representative facility management device (parent device) 3 (step S2*d*). When the digital signature is not correct (step S2*e*: NO), the verification code analyzer 33 returns a verification error to the monitoring terminal 4, and disconnects the connection (step S2*h*). When the digital signature is correct (step S2*e*: YES), the verification code analyzer 33 continues the verification code verifying process.

Next, the verification code analyzer 33 determines whether or not the date and time of issue of the verification code decoded in step S2*b* and IP address of the connection source are proper (step S2*f*). Here, the judgment of the date and time of issue checks whether or not a prescribed amount of time or more has elapsed since the code was issued. By performing this judgment it is not possible to improperly reuse a verification code that was used in the past (replay attack measure). Moreover, the judgment of the IP address of the connection source checks whether or not the currently connected monitoring terminal 4 has the same IP address that is given in the verification code. As a result of this judgment, it is not possible to improperly use an intercepted verification code from another terminal (identity fraud attack measure).

When the date and time of issue, or the IP address of the connection source is not correct and is in error (step S2*f*: NO), the verification code analyzer 33 returns a verification error to the monitoring terminal 4, and disconnects the connection (step S2*h*). In other words, the verification code analyzer 33 performs verification based on the date and time of issue and IP address of the connection source that are updated for every verification. When the date and time of issue and the IP address of the connection source are proper (step S2*f*: YES), the verification code analyzer 33 returns a response indicating that the verification code is correct (step S2*g*).

The verification code verifying process of the request command received from the monitoring terminal 4 is now finished, and the monitoring terminal 4 is able to access other facility management devices 3 as well by just logging in one time to the representative facility management device (parent device) 3.

Next, the procedure for displaying icons for the equipment 2 on the Web screen after the login verification has been performed using the procedure described above will be explained with reference to FIG. 7.

After login verification has been performed by the facility management device (parent device) 3 by the procedure described above, the monitoring terminal 4 acquires the Web contents 80 that were acquired from the facility management device (parent device) 3 (step S3*a*). Next, the monitoring terminal 4 (screen configuration file analyzer 141) analyzes the Web contents 80, displays a screen according to the acquired HTML file (step S3b), and executes the monitoring program (JavaScript (registered trademark)) that is embedded inside the HTML file (step S3c).

The monitoring program executor 142 (data communication manager 143) adds verification code to the facility management device 3 that acquired the Web contents 80, and connects using the WebSocket method (step S3d). Here, the WebSocket method is a technical standard for bi-directional communication between a Web server and Web client. By connecting using the WebSocket method, it is possible to always remain connected, which differs from the HTTP protocol. Therefore, when communication is necessary, it is possible to start transmission from either the Web server or the Web client. As a result, it is possible to transmit information only when there is a change in the equipment such as a change in the operation or state.

After connection is completed, the data communication manager 143 acquires system configuration data 90 that includes the facility management device address list 91 in which address information such as the IP addresses and host names of the facility management devices 3 that are connected in the facility management system 1 are inputted (step S3e).

Next, the data communication manager 143 stores the acquired system configuration data 90 in the database 150 as system configuration data 151 (step S3f).

First, the facility management device 3 (controller 30) determines whether or not processing is complete for all facility management devices 3 (step S3g: NO). Here, this is still just the first device so judgment is NO (step S3g: NO), so the facility management device 3 (controller 30) advances to step S3h.

Continuing, the equipment data manager 144 connects to the facility management devices 3 using the WebSocket method for each of the IP addresses or host names of the facility management devices 3 included in the system configuration data 151 in the database 150 (step S3h). Next, the equipment data manager 144 acquires and stores the connection information 155 for the equipment 2 (step S3i). The equipment data manager 144 acquires and stores operating state data 156 for the equipment 2 (step S3j). The equipment data manager 144 also acquires and stores equipment display position data 157 (step S3k). In this way, the equipment data manager 144 stores data in the database 150 as equipment data 154.

The verification code generator 36 repeats the processing from step S3g to step S3k until equipment data 154 has been acquired from all of the facility management devices 3.

After equipment data 154 has been acquired from all of the facility management devices (parent device and child devices) 3 (step S3g: YES), the equipment data manager 144 in the monitoring program executor 142 displays equipment icons indicating the operating states on a floor plan on the Web screen according to the display position data 156 for all of the equipment 2 (step S3m).

After this, when there is a change in the operating state of the equipment 2, the facility management device 3 transmits data indicating the change in the state to the monitoring terminal 4. After receiving the transmission, the monitoring terminal 4 stores that data as equipment data 154. When the equipment data 154 such as operating state data 156 or display position data 157 is updated, the equipment data manager 144 updates the displayed state of the equipment icons.

The monitoring screen display process by the monitoring terminal 4 is now finished. As a result, it is possible to monitor the operating states of an equipment group 7 that is managed by multiple facility management devices 3 on the same Web page.

Figure 7:
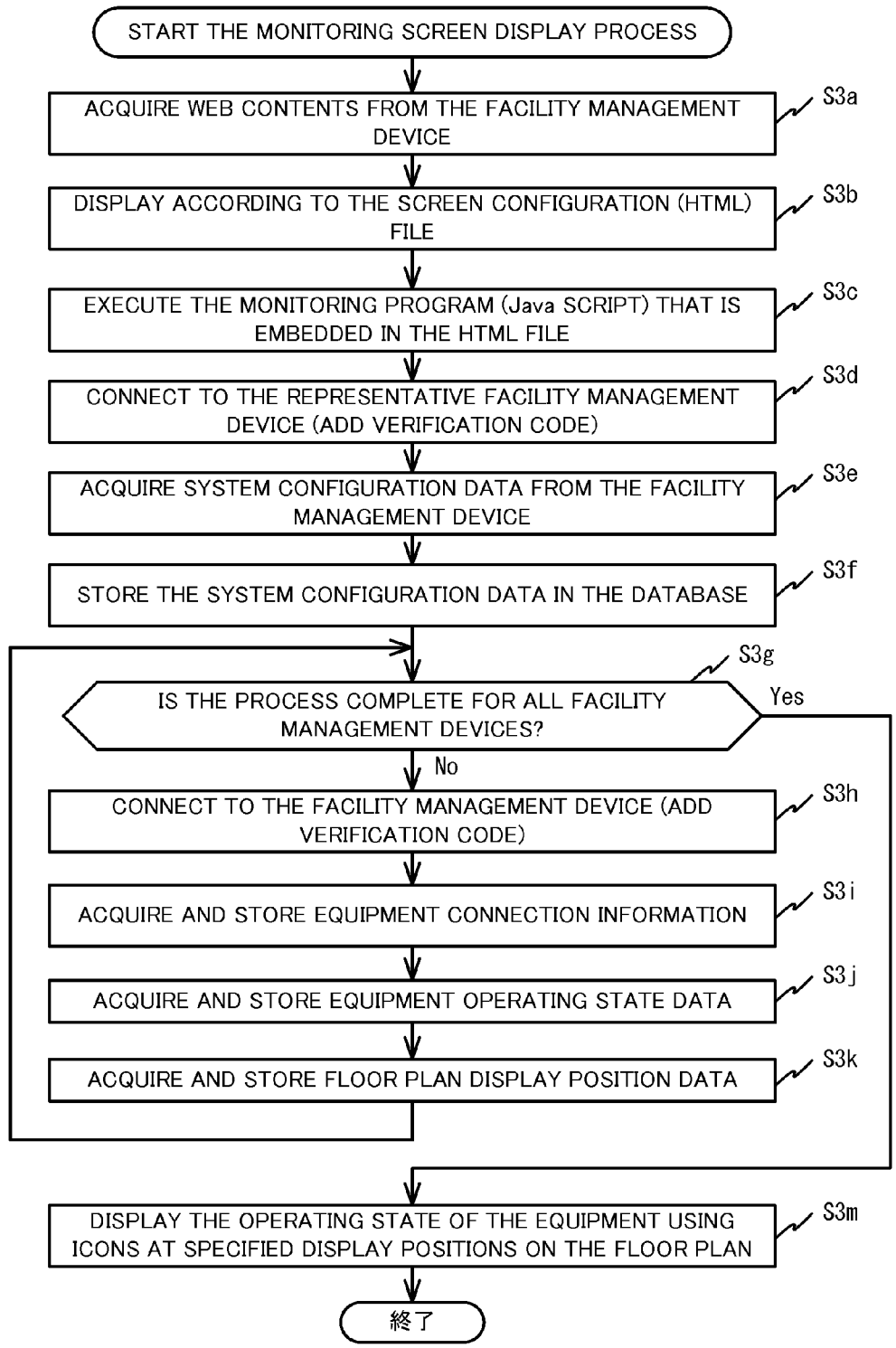
FIG. 7 is a flowchart of a monitoring screen display process.
Figure 8:
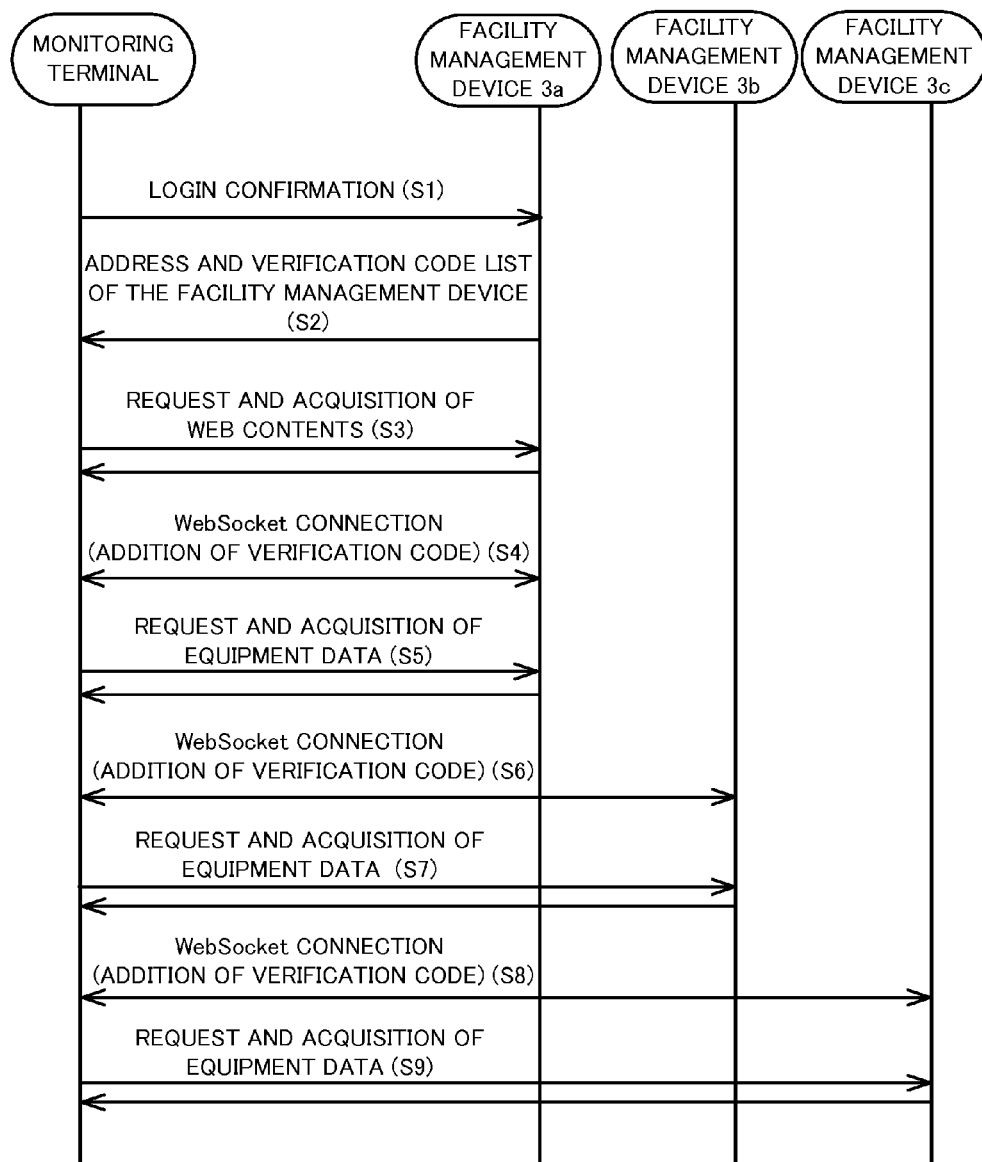
FIG. 8 is a drawing illustrating the communication sequence between a monitoring terminal and a facility management device.

FIG. 8 illustrates a communication sequence that is performed by the processing illustrated in FIG. 4, FIG. 6 and FIG. 7. As illustrated in FIG. 8, after login verification (S1), the monitoring terminal 4 acquires a list of addresses and verification codes for all of the facility management devices 3 (S2), then requests and acquires Web contents for the screen display (S3), after which the monitoring terminal 4 performs WebSocket connections (adds verification code) (S4, S6, S8), and directly acquires equipment data 154 from each of the facility management devices 3 (S5, S7, S9). In this way, it is possible to decentralize processing while maintaining safety of verification codes.

Figure 9:
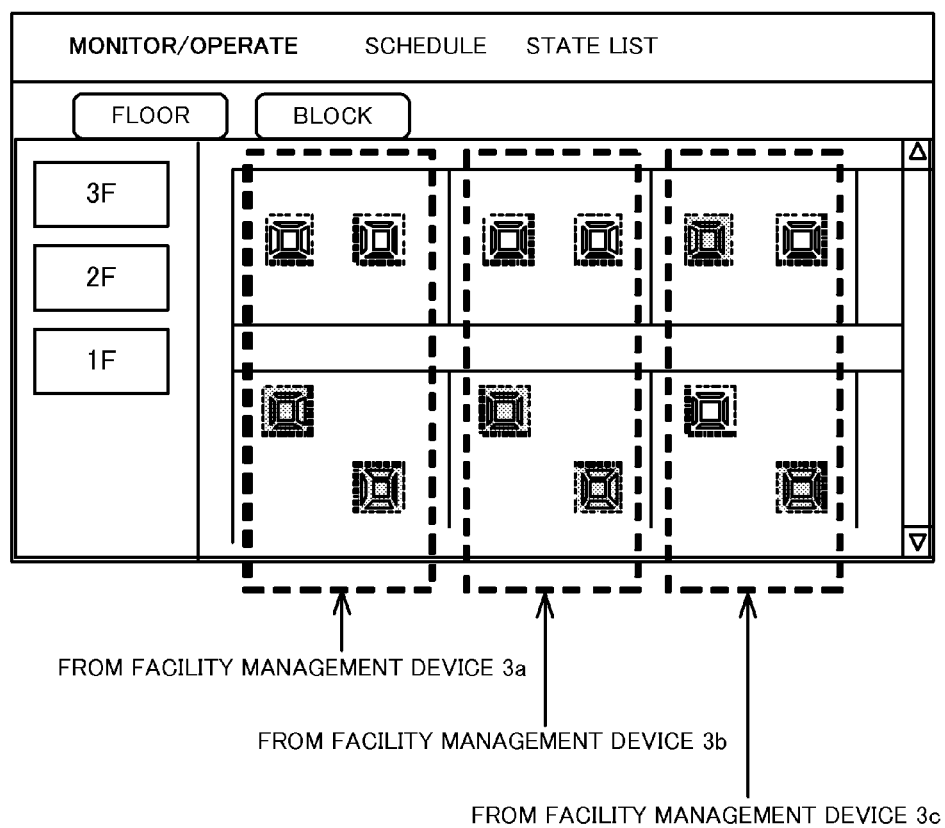
FIG. 9 is a drawing illustrating an example of a floor-monitoring screen that is displayed by a monitoring terminal.

FIG. 9 illustrates an example of a floor-monitoring screen that is displayed on the monitoring terminal 4. As illustrated in FIG. 9, this monitoring screen is a monitoring screen for an equipment group 7 (see FIG. 1) on the same floor that is managed by multiple facility management devices 3 (3a, 3b, 3c). On the monitoring terminal 4 (see FIG. 3), icons are arranged according to operating state data 156 (see FIG. 3) for equipment 2 that is acquired from the multiple facility management devices 3 on a floor plan on one Web page that is displayed by the Web browser according to display position data 157 that was acquired from the facility management devices 3.

Here, an example is given in which the multiple facility management devices 3a, 3b, 3c are located on the same floor, however, in the case where facility management devices 3 are installed in floor units, it is also possible to similarly display the operating states of equipment 2 on multiple floors on one Web page.

Figure 10:
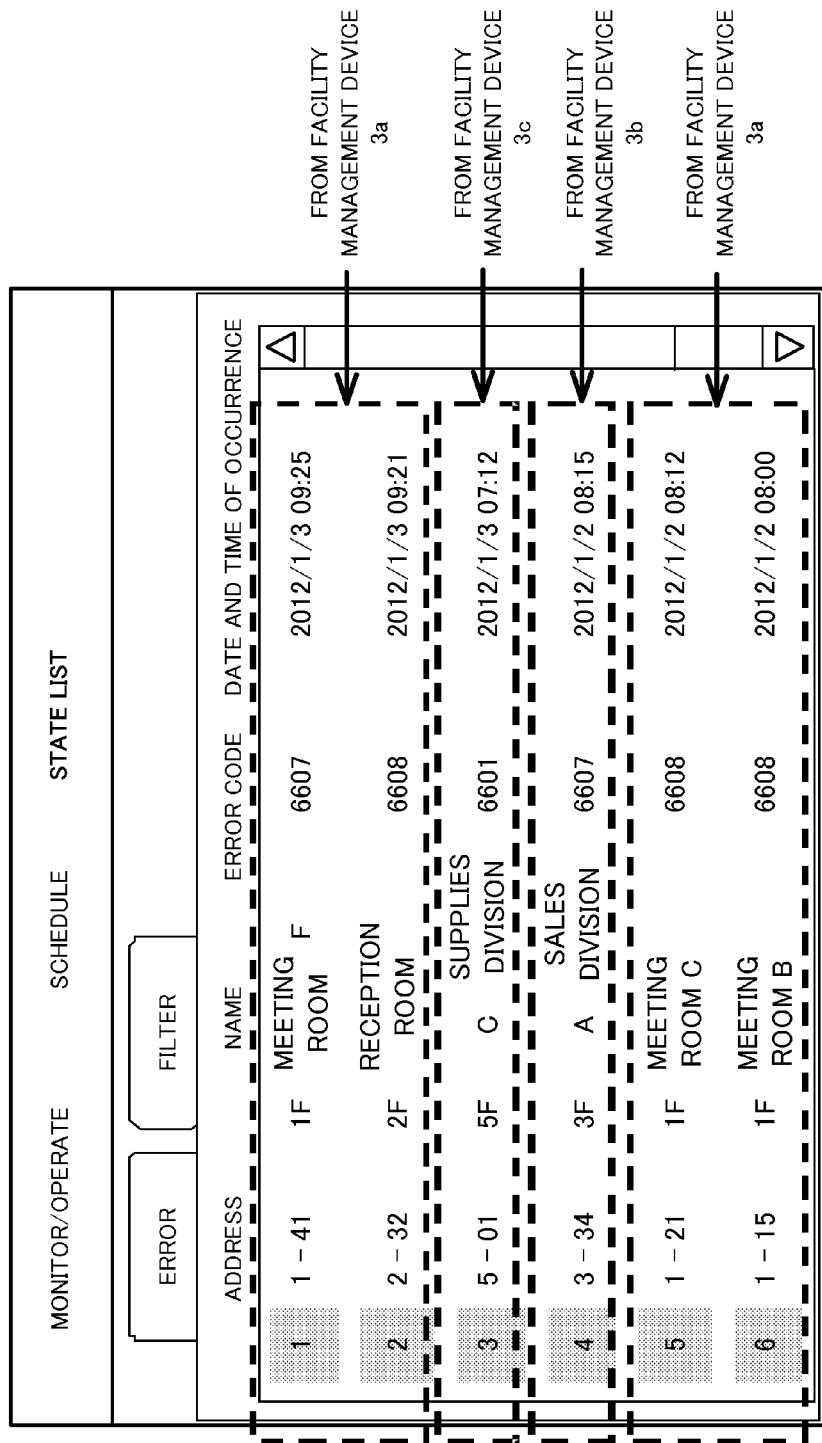
FIG. 10 is a drawing illustrating an example of a unit error screen that is displayed by a monitoring terminal.

FIG. 10 illustrates an example of a screen that is displayed on the monitoring terminal 4 (see FIG. 3) and displays a unit in which an error has occurred. As illustrated in FIG. 10, on this screen, the equipment 2 in which errors occurred are displayed in order of date and time of occurrence in the Web page according to the operating state data 155 (see FIG. 3) for the equipment 2 that was acquired from the facility management devices 3a, 3b, 3c.

Next, the processing that is performed when there is a change in the operating state of equipment 2 will be explained with reference to FIG. 11 and FIG. 12.

Figure 11:
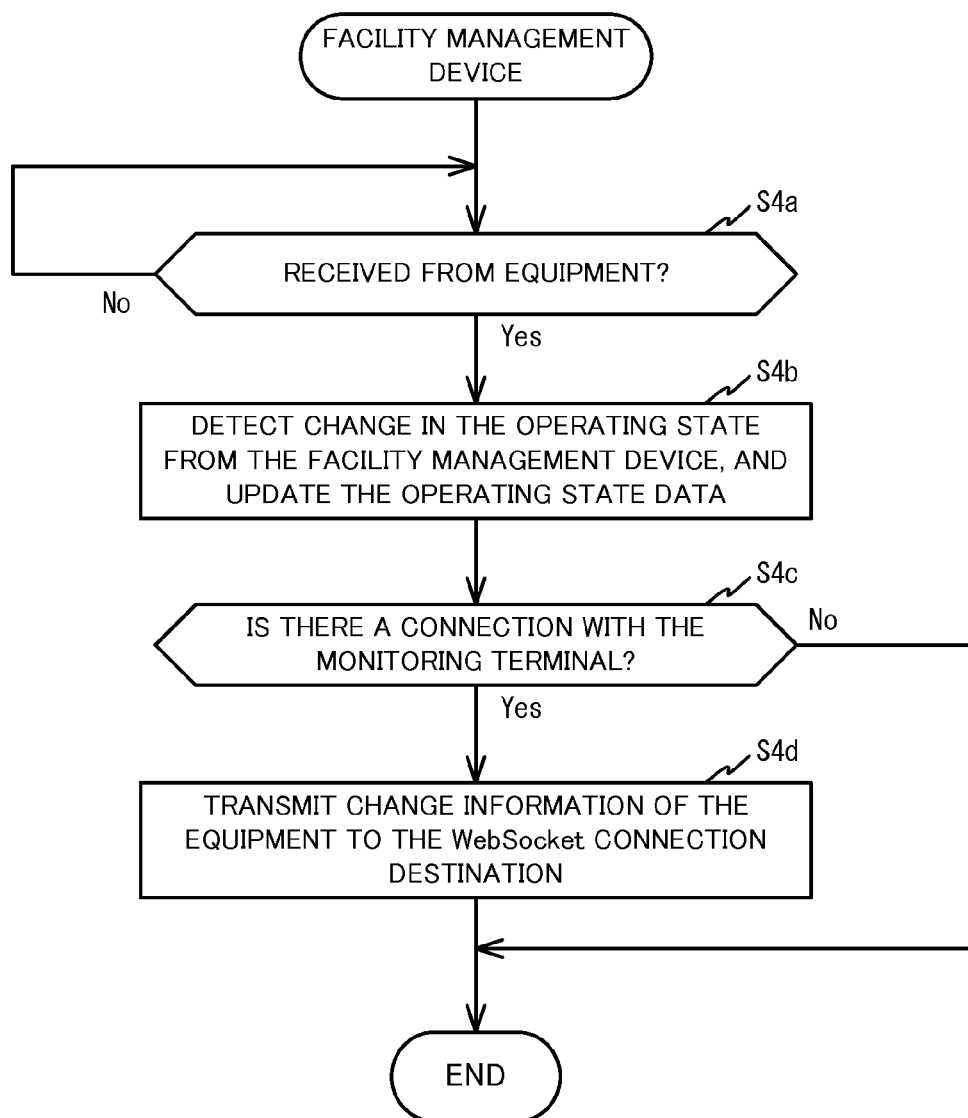
FIG. 11 is a flowchart of processing that is executed by a facility management device when there was a change in the state of some equipments.

FIG. 11 illustrates processing by a facility management device 3 when a change occurred in the operating state of equipment 2.

The facility management device 3 waits until information is received from the equipment 2 (step S4a: NO). After information is received (step S4a: YES), the facility management device 3 is such that when the operating state of the equipment 2 is operated by a remote control (not illustrated in the figures) that is connected to the equipment 2, or operated by a facility management device 3, the equipment manager 31 inside the facility management device 3 detects the change in the operating state by a transmission from the equipment 2 and updates the operating state data 72 (step S4b).

Next, the facility management device 3 determines whether or not there is a connection with the monitoring terminal 4 (whether or not there is a WebSocket connection) (step S4c), and when there is a connection (step S4c: YES), the facility management device 3 transmits change information about the change in the operating state of the equipment 2 to the monitoring terminal 4 a that is the WebSocket connection destination (step S4d).

Figure 12:
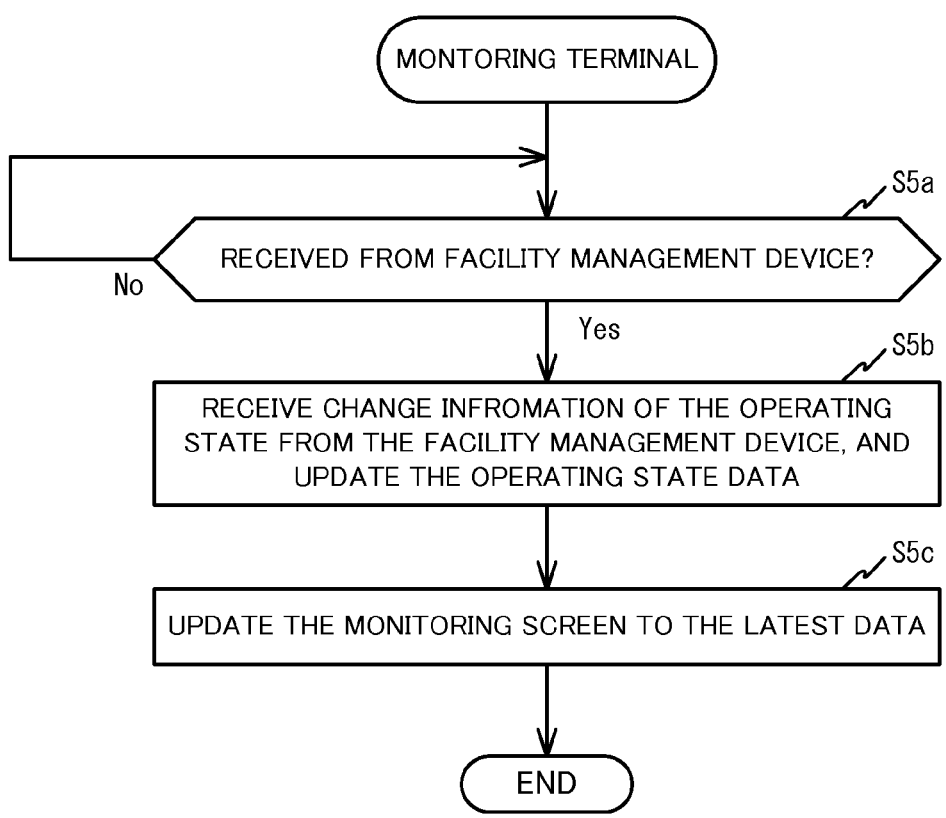
FIG. 12 is a flowchart of processing by a monitoring terminal that is executed when state change information is received from a facility management device.

FIG. 12 illustrates processing by the monitoring terminal 4 that is executed after receiving a transmission of change information about a change in the operating state data 72 of the equipment 2 from a facility management device 3.

The monitoring terminal 4 waits until the change information for the change in the operating state of the equipment 2 is received from the facility management device 3 (step S5a: NO), and after the information is received (step S5a: YES), the monitoring terminal 4 updates the operating state data 156 in the equipment data 154 (step S5b).

Continuing, the monitoring terminal 4 (equipment data manager 144) updates the operating state of the equipment on the monitoring screen that is currently displayed to the latest operating state (step S5c).

Processing that is performed when the operating state of the equipment 2 changed now ends, and it is possible to perform constant monitoring of the latest operating state data of an equipment group 7 that is managed by multiple facility management devices 3.

In other words, the equipment data manager 144 transmits data that indicates the updated operating state to the monitoring terminal 4 when the operating state of equipment 2 that is managed by the equipment manager 31 has been updated.

It is not particularly clear in this embodiment, however, the Web contents 80, system configuration data 90, user registration information 100 and encoding process data 110 that are stored by a facility management device 3 are set in advance in the facility management device 3. Such settings can be performed from the input device 20 of the facility management device 3, or can be performed from the Web browser of the monitoring terminal 4.

Moreover, the display position data 73 of the equipment 2 can be set from the input device 20 of the facility management device 3, or can be set from the Web browser of the monitoring terminal 4, checking the display position.

Moreover, in this embodiment, the facility management device 3 comprises a display 10 and an input device 20, however, does not absolutely need to comprise a display 10 and an input device 20. For example, instead of comprising a display 10 and input device 20, it is possible to perform various settings and operations by way of the communication lines 6.

Furthermore, in this embodiment, the monitoring terminal 4 uses a Web browser on a personal computer, however, a terminal that is able to activate a Web browser on the facility management device 3 and read the Web contents 80, and monitor an equipment group 7 that is connected to other facility management devices 3 on the own device display 10 by the same processing procedure as illustrated in FIG. 4 can also be used as the monitoring terminal 4.

In this embodiment, the monitoring terminal 4 is taken to be a personal computer, however, it is not absolutely necessary to use a personal computer. It is also possible to use a special terminal, tablet terminal or the like that is capable of executing the monitoring program 82.

Moreover, in this embodiment, communication of all commands is taken to be possible after verification, however, it is also possible to limit the commands that can be accessed by a user that has logged in by adding information that indicates the authorization level and user name in the verification code.

Furthermore, in this embodiment, replay attacks are prevented by verifying the date and time of issue and the IP address of the connection source that are provided in the verification code, however, it is not absolutely necessary to prevent replay attacks by using these data, and it is also possible to prevent replay attacks by entering a counter value or the like in the verification code.

In this embodiment, the verification data performs a digital signature by using the secret key of the representative facility management device 3, however, instead of a digital signature, it is also possible to use a method of encoding part of the verification data using the secret key of the representative facility management device 3.

Moreover, in this embodiment, the serial number of a facility management device 3 is used as a public key, however, it is also possible to use a number other than the serial number that is unique to the facility management device 3, or it is possible to use a public key that is a normally used random number.

The communication format between the monitoring terminal 4 and a facility management device 3 can be a text format that uses XML (Extensible Markup Language) or the like, or can be another format such as binary format for reducing the communication size. It is also possible to encode communication so that the transmitted information can be concealed.

Moreover, in this embodiment, WebSocket that is capable of always being connected is used as the communication method, however, it is not absolutely necessary to use WebSocket, and it is also possible to use HTTP protocol or a unique protocol.

Furthermore, in this embodiment, for example, the case where multiple facility management devices 3 are installed inside a building was described. However, the present disclosure can also be applied to a system in which the facility management devices 3 are located at respective bases that are geographically separated, and VPN connection is performed from the monitoring terminal 4 by way of the Internet. In this case, verification information can be shared between each base, and on the Web screen, for example, it is possible to display icons that indicate the facility management devices 3 on a map that covers the area of the multiple bases.

As was explained in detail above, with the facility management devices 3 and monitoring terminal 4 of this embodiment, verification code is issued when the monitoring terminal 4 logs in to a representative facility management device (parent device) 3, and the monitoring terminal 4 tries to connect to other facility management devices 3 by adding that verification code. In doing so, it becomes possible to access multiple facility management devices by performing login verification only one time, as well as it is possible to eliminate communication between a verification server (parent device) and a target site (child device); and even when the monitoring terminal 4 is connected one-to-one to each facility management device 3 with a VPN connection, it is possible to access other facility management devices 3 by performing login only one time.

Moreover, with the facility management devices 3 and monitoring terminal 4 of this embodiment, a digital signature is performed in the verification code using a secret key that is only stored by a facility management device (parent device) 3, so it is possible to prevent manipulation or forgery of verification code by a user with malicious intent.

Furthermore, with this embodiment, by inputting the IP address of the connection source in the verification code, and verifying that the IP address of the terminal that is actually connected matches the IP address in the verification code, it is possible to prevent unauthorized copying of the verification code, and prevent unauthorized access from other terminals.

With this embodiment, the verification code is encoded using the (serial number) of the facility management device 3 that is to be connected, and the verification code can only be decoded using a secret key that is stored by the target facility management device 3. Therefore, even in the case that the verification code is intercepted and improperly obtained, it is not possible to analyze the contents of the verification code, so it is possible to prevent forgery of the verification code.

Moreover, with this embodiment, by inputting the date and time of issue in the verification code, it is possible to prevent reply attacks by someone trying to perform unauthorized access by intercepting the verification code and adding the identical verification code.

Furthermore, with this embodiment, by using ID based encoding technology and making the public keys of the facility management devices 3 easy for a person to understand such as by using serial numbers or the like, setting the facility management device public key list 112 that is stored in the representative facility management device 3 beforehand becomes easy.

With this embodiment, by using WebSocket that makes it possible to maintain a TCP connection for a long period of time, verification using verification code only needs to be performed one time even when a plurality of communication is performed, so the verification code can be used as verification code that is valid only one time and can be discarded after use, and thus construction of the system is made safer.

Moreover, with this embodiment, the monitoring program that is executed on the Web page (monitoring program executor 142) connects to multiple facility management devices 3 and acquires operating state data 72. In doing so, it becomes possible to display together all of the states of the equipment 2 managed by multiple facility management devices 3 on the same Web page. As a result, it is possible to eliminate problems, such as neglecting equipment error, forgetting to turn off lights, or complex management because all of the equipment 2 could not be managed without having to switch the connection destination (URL) for all of the management facility devices 3, that occurred because it was only possible to check operating states and abnormal states on an individual Web page for each facility management device 3.

In this embodiment, the program that is executed is stored and distributed on a non-transitory recording medium such as a flexible disk, CD-ROM (Compact Disc Read-Only Memory), DVD (Digital Versatile Disc), MO (Magneto-Optical Disc) and that like that can be read by a computer, and a system that executed that program can be constructed by installing that program.

Moreover, it is also possible to store the program on a disk device of a specified server on a communication network such as the Internet, and for example, to download the program by superposition of the program on a carrier wave.

Furthermore, when the functions described above are achieved by sharing with an OS (Operating System), or achieved by an OS cooperating with an application, it is possible to store and distribute only the part other than the OS, and to download that portion.

The embodiment above can undergo various changes or modifications within the range of the scope of the present disclosure. The embodiment described above is for explaining the present disclosure, and is not intended to limit the range of the disclosure. In other words, the range of the present disclosure is as disclosed in the accompanying claims rather than in the embodiment. Various changes and modifications that are within the range disclosed in the claims or that are within a range that is equivalent to the claims of the invention are also included within the range of the present disclosure.

INDUSTRIAL APPLICABILITY

This disclosure is suitable in the case of managing equipment that is managed by multiple facility management devices that are located in housing in a building and the like by one monitoring terminal.

REFERENCE SIGNS LIST

1 Facility management system
2 Equipment
3 Facility management device
4 Monitoring terminal
5 Dedicated communication line
6 Communication line
7 Equipment group
10 Display
20 Input device
30 Controller
31 Equipment manager
32 User verification processor
33 Verification code analyzer
34 Web server
35 User verifier
36 Verification code generator
37 Equipment data communicator
38 System connection data communicator
40 Data manager
50 Equipment communication manager
60 Monitoring terminal communication manager
70 Equipment data
71 Connection information
72 Operating state data
73 Display position data
80 Web contents
81 Screen configuration file
82 Monitoring program
83 Floor plan data
90 System configuration data
91 Facility management device address list
100 User registration information
110 Encoding process data
111 Self-owned secret key
112 Facility management device public key list
120 Display
130 Input device
140 Web contents display controller
141 Screen configuration file analyzer
142 Monitoring program executor
143 Data communication manager
144 Equipment data manager
150 Database
151 System configuration data
152 Facility management device address list
153 Facility management device verification code list
154 Equipment data
155 Connection information
156 Operating state data
157 Display position data
160 Communication manager

The invention claimed is:

1. A facility management device being a representative facility management device among a plurality of facility management devices that manages equipment, comprising:
a user verifier, embodied as a computer with a central processing unit (CPU) and a memory, that performs a user verification according to a request from a monitoring terminal;
a verification code generator, embodied as the computer, that generates verification codes for each of the plurality of facility management devices by encoding verification data using unique public keys of each of the plurality of facility management devices, when the user verification is successful, and to transmit those verification codes to the monitoring terminal; and
a public key list storage that stores a list of public keys of each of the plurality of facility management devices, wherein
the verification code generator:
adds a digital signature that uses a self-owned secret key to the verification data as data that indicates the user verification was successful, and
generates verification codes for each of the facility management devices as data that was encoded using data to which a digital signature was added as the public keys of each of the facility management devices stored in the public key list storage.

2. The facility management device according to claim 1, wherein
the public keys of each of the plurality of facility management devices are serial numbers that are unique to each of the plurality of facility management devices.

3. A facility management system, comprising:
a monitoring terminal; and
a facility management device being a representative facility management device among a plurality of facility management devices that manages equipment, the facility management device comprising:
a user verifier, embodied as a computer with a central processing unit (CPU) and a memory, that performs a user verification according to a request from the monitoring terminal;
a verification code generator, embodied as the computer, that generates verification codes for each of the plurality of facility management devices by encoding verification data using unique public keys of each of the plurality of facility management devices, when the user verification is successful, and to transmit those verification codes to the monitoring terminal; and
a public key list storage that stores a list of public keys of each of the plurality of facility management devices, wherein
the verification code generator:
adds a digital signature that uses a self-owned secret key to the verification data as data that indicates the user verification was successful, and
generates verification codes for each of the facility management devices as data that was encoded using data to which a digital signature was added as the public keys of each of the facility management devices stored in the public key list storage.

4. A method of managing equipment by a facility management device, the facility management device being a representative facility management device among a plurality of facility management devices and including a user verifier, embodied as a computer with a central processing unit (CPU) and a memory, a verification code generator embodied as the computer, and a public key list storage that stores a list of public keys of each of the plurality of facility management devices, the method comprising:
a user verification step including performing, by the user verifier, according to a request from a monitoring terminal, a user verification;
a public key verification code generating step that includes, when the user verification is successful, generating, by the verification code generator, verification codes for each of the plurality of facility management devices by encoding verification data using unique public keys of each of the plurality of facility management devices, and transmitting, by the verification code generator, the verification codes to the monitoring terminal;
an add digital signature step that includes adding, by the verification code generator, a digital signature that uses a self-owned secret key to the verification data as data that indicates the user verification was successful; and
a digital signature verification code generation step that includes generating, by the verification code generator, verification codes for each of the plurality of facility management devices as data that was encoded using data to which a digital signature was added as the public keys of each of the facility management devices stored in the public key list storage.

5. A computer-readable non-transitory storage medium, with instructions stored thereon, that when executed by a user verifier and a verification code generator, embodied as a computer, among a plurality of computers, with a central processing unit (CPU) and a public key list storage that stores a list of public keys of each of the plurality of computers, causes the user verifier and the verification code generator to perform a method that manages equipment, the method comprising:
a user verification step including performing, by the user verifier, according to a request from a monitoring terminal, a user verification;
a public key verification code generating step that includes, when the user verification is successful, generating, by the verification code generator, verification codes for each of the plurality of facility management devices by encoding verification data using unique public keys of each of the plurality of facility management devices, and transmitting, by the verification code generator, the verification codes to the monitoring terminal;
an add digital signature step that includes adding, by the verification code generator, a digital signature that uses a self-owned secret key to the verification data as data that indicates the user verification was successful; and
a digital signature verification code generation step that includes generating, by the verification code generator, verification codes for each of the plurality of facility management devices as data that was encoded using data to which a digital signature was added as the public keys of each of the facility management devices stored in the public key list storage.

* * * * *